United States Patent [19]

Chung et al.

[11] Patent Number: 5,095,051

[45] Date of Patent: Mar. 10, 1992

[54] AMIDE DIOL EXTENDED CATHODIC ELECTRODEPOSITION RESINS

[75] Inventors: Ding Y. Chung, Rochester Hills; Tapan K. Debroy, Shelby Township, Macomb County; Robert A. Tessmer, Mt. Clemens, all of Mich.

[73] Assignee: E. I. Du Pont de Nemours and Company, Wilmington, Del.

[21] Appl. No.: 563,838

[22] Filed: Aug. 6, 1990

[51] Int. Cl.$^5$ .................. C08G 59/42; C08G 59/62; C08L 63/00
[52] U.S. Cl. .................................. 523/417; 523/420; 528/111; 204/181.7
[58] Field of Search .............. 523/417, 420; 528/111; 204/181.7

[56] References Cited

U.S. PATENT DOCUMENTS

| | | | |
|---|---|---|---|
| 3,025,323 | 3/1962 | Rose et al. | 260/561 |
| 4,104,147 | 8/1978 | Marchetti et al. | 204/181 C |
| 4,419,467 | 12/1983 | Wismer et al. | 523/414 |
| 4,609,446 | 9/1986 | Geist et al. | 528/111 |
| 4,724,254 | 2/1988 | Geist et al. | 528/111 |
| 4,780,524 | 10/1988 | Dobbelstein et al. | 528/111 |

Primary Examiner—Paul R. Michl
Assistant Examiner—Christopher P. Rogers
Attorney, Agent, or Firm—Hilmar L. Fricke

[57] ABSTRACT

An improved electrodepositable cationic resin is disclosed. Prior art electrodepositable cationic resins are formed from polyepoxides which are chain extended with polyether or polyester polyols to internally flexibilize the resin. Our polyepoxide resin is chain extended with amide diol which gives a resin which is hydrolytically stable and does not tend to absorb moisture.

6 Claims, No Drawings

AMIDE DIOL EXTENDED CATHODIC ELECTRODEPOSITION RESINS

FIELD OF ART

The field of art to which this invention pertains is electrodepositable epoxy resins chain extended with amide diols containing crosslinking agents to be used in cathodic electrocoat processes.

BACKGROUND ART

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is made the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then salted with an acid to form a water emulsion which is usually referred to as a principal emulsion.

The principal emulsion is combined with a pigment paste, coalescent solvents, water, and other additives to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a certain period of time. The object is rinsed with deionized water and the coating is cured typically in an oven at sufficient temperature to produce crosslinking.

Prior art of cathodic electrodepositable resin compositions, coating baths, and cathodic electrodeposition processes are disclosed in U.S. Pat. Nos. 3,922,253; 3,984,299; 4,093,594; 4,134,864; 4,137,140; 4,419,467; and 4,468,307, the disclosures of which are incorporated by reference.

An important characteristic of the electrodeposition resins are their flexibility. In fact, to be useful as an electrocoat resin, the polyepoxide must be chain extended by an internal flexibilizer. The internal flexibilizer enhances flow and coalescence and increases rupture voltage of the composition. Currently, internal flexibilization is usually accomplished by chain extending the polyepoxide with a polyether polyol or a polyester polyol. However, polyester polyols do not have the desired hydrolytic stability and polyether polyols tend to absorb moisture. What is needed is an internal flexibilizer which has the desired hydrolytic stability and does not absorb moisture.

SUMMARY OF THE INVENTION

In accordance with the present invention, an electrodepositable resin is provided. The resin is typical of the well known aromatic polyepoxide resins except that it has been internally plasticized by reacting the aromatic polyepoxide with an amide diol. The resulting resin is hydrolytically stable and does not absorb moisture.

DETAILED DESCRIPTION

As discussed above, it is well known that most principal emulsions in electrodeposition coatings comprise an epoxy amine adduct blended with a crosslinking agent and salted with an acid in order to get a water soluble product.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are
2,2-bis-(4-hydroxy-3-tertiarybutylphenyl)-propane,
1,1-bis-(4-hydroxyphenyl)ethane,
2-methyl-1,1-bis-(4-hydroxyphenyl) propane,
2,2-bis-(4-hydroxy-3-tertiarybutylphenyl)propane,
bis-(2-hydroxynaphthyl)methane,
1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as
1,2-cyclohexanediol, 1,4-cyclohexanediol,
1,2-bis(hydroxymethyl)cyclohexane,
1,3-bis-(hydroxymethyl)cyclohexane and hydrogenated bisphenol A.

The polyepoxides have molecular weights of at least 200 and preferably within the range of 200 to 2000, and more preferably about 340 to 2000.

To be useful as an electrocoat, the polyepoxide must be chain extended by an internal flexibilizer. The internal flexibilizer enhances flow and coalescence and increases rupture voltage of the composition. Currently, internal flexibilization is usually accomplished by chain extending the polyepoxide with a polyether or a polyester polyol.

It has been found that substituting an amide diol for the polyether polyol or polyester polyol results in a flexibilized resin which is hydrolytically stable and does not tend to absorb moisture. These improvements are realized while maintaining the flow and coalescence characteristics of a polyepoxide resin chain extended with a polyether polyol or polyester polyol.

The amide diol is formed in one of two methods: (1) as a condensation product of a diacid and an alkanol amine, which has a primary alcohol and a primary amine terminating group; or (2) as a reaction product of a di-primary amine and epsilon-caprolactone.

In method (1), the molar ratio between diacid and alkanol amine is 1.5:1 to 1:1. The preferred ratio is 1:1. The removal of water from the reaction mixture is necessary during the condensation reaction, as is well known in the art. The preferred diacids are aliphatic diacids, such as adipic acid and azelaic acid. The preferred alknaol amines are aliphatic alkanol amines, such as ethoxylated hydroxy amine (polyglycol amine H-163 ® available from Union Carbide).

In method (2), the molar ratio of epsilon-caprolactone and diamine is 3:1 to 2:1. The preferred ratio is 2.2:1. The preferred diamines are aliphatic diamines, such as hexamethylene diamine and Dytek A ® (2-methylpentamethylenediamine available from DuPont). The reaction is exothermic. The reaction temperature is between 100° C. to 230° C. The preferred temperature is 200° C.

Details for the preparation of amide diol are disclosed in U.S. Pat. No. 3,025,323 which is incorporated herein by reference.

The amide diol chain extended polyepoxide is reacted with a cationic group former, for example, an amine.

The amines used to adduct the epoxy resin are monoamines, particularly secondary amines with primary hydroxyl groups. When you react the secondary amine containing the primary hydroxyl group with the terminal epoxide groups in the polyepoxide the result is the amine epoxy adduct in which the amine has become tertiary and contains a primary hydroxyl group. Typical amines that can be used in the invention are methyl ethanol amine, diethanolamine, and so forth. Our preferred amine is diethanol amine.

Mixtures of the various amines described above can be used. The reaction of the secondary amine with the polyepoxide resin takes place upon mixing the amine with the product. The reaction can be conducted neat, or, optionally in the presence of suitable solvent. The reaction may be exothermic and cooling may be desired. However, heating to a moderate temperature, that is, within the range of 50° to 150° C., may be used to hasten the reaction.

The reaction product of secondary amine with the polyepoxide resin attains its cationic character by at least partial neutralization with acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

The extent of cationic group formation of the resin should be selected such that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when there is an electrical potential between the anode and cathode immersed in the aqueous dispersion.

In general, most of the cationic resins prepared by the process of the invention contain from about 40 to 80, preferably from about 50 to 70 milliequivalents of cationic group per hundred grams of resin solids.

The cationic resinous binder should preferably have average molecular weights, as determined by gel permeation chromatography using a polystyrene standard, of less than 10,000, more preferably less than 5,000 and most preferably less than 3,000 in order to achieve high flowability.

After forming the above described cationic resin, it is mixed with a crosslinking agent.

The crosslinking agents of our novel process are well known in the prior art. Typical crosslinkers are aliphatic and aromatic isocyanates such as hexamethylene diisocyanate, toluene diisocyanate, methylene diphenyl diisocyanate and so forth. These isocyanates can also be reacted with a polyol such as trimetholpropane to form a polyisocyanate. The isocyanate is then pre-reacted with a blocking agent such as methyl ethyl ketoxime or ethylene glycol mono butyl ether to block the isocyanate functionality (i.e., the crosslinking functionality). Upon heating the blocking agent separates and crosslinking occurs. The preferred crosslinking agent for our invention is toluene diisocyanate (TDI) reacted with trimethyol propane (TMP) and blocked with ethylene glycol mono butyl ether.

The ratio of TDI to TMP is about 3:1. The ethylene glycol mono butyl ether is usually added in an equivalent ratio of about 1:1 to the TDI/TMP polyisocyanate. Reaction conditions for the above reactions are well known in the art and are disclosed in the following patents. U.S. Pat. Nos. 4,031,050 and 3,947,358.

The cationic resin and the blocked isocyanate are the principal resinous ingredients in the electrocoating composition and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 0.5:1, more preferably less than 0.4:1, and usually about 0.2 to 0.4:1. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as "Amine C,". These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers are usually used in amounts of about 0 to 15 percent by weight resin solids.

Curing catalysts such as tin catalysts are usually present in the composition. Examples are dibutyltin dilaurate and dibutyltin oxide. When used, they are typically present in amounts of about 0.05 to 1 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns preferably less than 5 microns. The concentration of the resinous products in the aqueous medium is, in general, not critical, but ordinarily the major portion of the aqueous dispersion is water. The aqueous dispersion usually contains from about 3 to 50 percent typically 5 to 40 percent by weight resin solids. Fully diluted electrodeposition baths generally have solids contents of about 3 to 25 percent by weight.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on weight of resin solids.

EXAMPLES

Example A

Preparation of Amide Diol

The first amide diol is a condensation product of azelaic acid and Polyglycolamine H-163 ® (an alkanol amine from Union Carbide, with a molecular weight of 163). To a reactor, azelaic acid, 470 parts, Polyglycolamine H-163 ®, 815 parts, and xylene, 134 parts, were added. The reaction mixture was heated to remove water. When there was no more water to be removed, most of the xylene was removed under vacuum.

Example B

Preparation of Amide Diol

The second amide diol is a reaction product of caprolactone and Dytek A (2-methyl pentamethylenediamine from Du Pont). To Dytek A, 348 parts, caprolactone, 752 parts, was added slowly. The reaction temperature was maintained below 65° C. during the addition and one hour after the addition. The reaction mixture, then, was heated to 204° C., and was held at 204° C. for eight hours.

Example C

| Preparation of Backbone Resin | | |
|---|---|---|
| | Wt. | NV |
| Epon 828 ® | 1494 | 1494 |
| Bisphenol A | 390 | 390 |
| Xylene | 98 | |
| 1st Benzyl Dimethyl Amine | 2 | |
| Amide Diol from Example A | 705 | 688 |
| 2nd Benzyl Dimethyl Amine | 5 | |
| Methylethanol Amine | 202 | 202 |
| Methylisobutylketone (MIBK) | 732 | |

Epon 828 ® (a diglycidyl ether of bisphenol A from Shell Chemical Co.), bisphenol A, xylene, and the 1st portion of benzyl dimethyl amine, were charged to reactor, and heated with nitrogen sparge to 160° C. The mixture was held at 160° C.–190° C. for one hour. The amide idol from Example A was added. At 146° C., the 2nd portion of benzyl dimethyl amine was added. The reaction mixture was held at 146° C. until a 1000 weight per epoxide was obtained. Methyl isobutyl ketone was added to cool the mixture. At 93° C., methylethanol amine was added. The mixture was held at 121° C. for one hour.

Example D

| Preparation of Backbone Resin | | |
|---|---|---|
| | Wt. | NV |
| Epon 828 ® | 1494 | 1494 |
| Bisphenol A | 390 | 390 |
| Xylene | 98 | |
| 1st Benzyl Dimethyl Amine | 2 | |
| Amide Diol from Example B | 528 | 528 |
| 2nd Benzyl Dimethyl Amine | 5 | |
| Methylethanol Amine | 189 | 189 |
| Methylisobutylketone | 763 | |

Epon 828 ®, bisphenol A, xylene, and the 1st portion of benzyl dimethyl amine, were charged to a reactor, and heated with nitrogen sparge to 160° C. The mixture was held at 160°–190° C. for one hour. The amide diol from Example A was added. At 146° C., the 2nd portion of benzyl dimethyl amine was added. The reaction mixture was held at 146° C. until a 1000 weight per epoxide was obtained. Methylisobutylketone was added to cool the mixture. At 93° C., methylethanol amine was added. The mixture was held at 121° C. for one hour.

Example E

| Preparation of Quaternizing Agent | | |
|---|---|---|
| | Wt. | NV* |
| 2-Ethylhexanol half capped TDI in MTBK | 320.0 | 304.0 |
| Dimethylethanolamine | 87.2 | 87.2 |
| Aqueous Lactic Acid Solution | 117.6 | 88.2 |
| 2-Butoxyethanol | 39.2 | |
| Total | 564.0 | 479.4 |

*non-volatiles

The quaternizing agent was prepared by adding dimethylethanolamine to the 2-ethylhexanol half-capped toluene diisocyanate (TDI) in a reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

Example F

| Preparation of Pigment Grinding Vehicle | | |
|---|---|---|
| | Wt. | NV |
| Epon 829 ® | 710.0 | 682.0 |
| Bisphenol A | 289.6 | 289.6 |
| 2-Ethylhexanol half capped TDI in MIBK | 406.0 | 386.1 |
| Quaternizing Agent from Ex. E | 496.3 | 421.9 |
| Deionized Water | 71.2 | |
| 2-Butoxyethanol | 1095.2 | |
| Total | 3068.3 | 1779.6 |

To form the pigment grinding vehicle, Epon 829 ® (a diglycidyl ether of Bisphenol A from Shell Chemical Co.) and Bisphenol A were charged under a nitrogen atmosphere to a suitable reaction vessel and heated to 150°-160° C. to initiate an exothermic reaction. The reaction mixture was permitted to exotherm for one hour at 150°-160° C. The reaction mixture was then cooled to 120° C. and the 2-ethylhexanol half-capped toluene diisocyanate was added. The temperature of the reaction mixture was held at 110°-120° C. for one hour, followed by the addition of the 2-butoxyethanol. The reaction mixture was then cooled to 85°-90° C., homogenized and then charged with water, followed by the addition of the quaternizing agent (from Example E). The temperature of the reaction mixture was held at 80°-85° C. until an acid value of about 1 was obtained. The reaction mixture had a solids content of 58 percent.

| Preparation of Emulsion: Example I | | | |
|---|---|---|---|
| | Wt. I-A | Wt. I-B | NV |
| Backbone resin from Example C | 281 | | 211 |
| Backbone resin from Example D | | 281 | 211 |
| Capped Isocyanate Crosslinker[1] | 162 | 162 | 113 |
| Downol PPH ® from Dow | 12 | 3 | |
| Surfactant[2] | 5 | 5 | |
| Deionized Water | 433 | 442 | |
| Lactic Acid | 16 | 16 | |
| Totals | 909 | 909 | |

[1]Capped Isocyanate Crosslinker formed from half-capping toluene diisocyanate (80/20 2,4/2,6 isomer mixture) with 2-ethyl hexanol and reacting this product with trimethylol propane in a 3:1 molar ratio. The crosslinker is present as a 70 percent solids solution in 2-ethoxy ethanol.
[2]Surfactant is a mixture of 120 parts "Amine C" from Ciba-Geigy, 120 parts acetylenic alcohol, commercially available as "Surfynol 104", 120 parts of 2-butoxy ethanol and 221 parts by weight of deionized water and 19 parts glacial acetic acid.

Thoroughly mix the backbone resin from Example C or Example D, polyurethane crosslinker, "Downol PPH", lactic acid, and surfactant. Then add the dionized water under agitation. Both the 1-A and 1-B emulsions had a solid content of 36%. The 1-A emulsion had a pH of 6.8 and the 1-B emulsion had a pH of 6.6.

| Preparation of Pigment Paste: Example II | | |
|---|---|---|
| | Wt. | NV |
| Grind Vehicle from Example F | 266.20 | 154.64 |
| Deionized Water | 455.30 | |
| Carbon Black | 25.98 | 5.98 |
| Aluminum Silicate | 51.85 | 51.85 |
| Lead Silicate | 22.24 | 2.24 |
| Dibutyl Tin Oxide | 16.34 | 16.34 |
| Titanium Dioxide | 296.23 | 296.23 |
| Total | 1134.56 | 567.28 |

The above ingredients were mixed together and ground in a mill to a Hegman No. 7 grind.

| Preparation of Electrocoat Bath: Example III | | | |
|---|---|---|---|
| | III-A | III-B | NV |
| Emulsion from Example I-A | 383 | | 138 |
| Emulsion from Example I-B | | 383 | 138 |
| Pigment Paste from Example II | 84 | 84 | 42 |
| Deionized Water | 433 | 433 | |
| Total | 900 | 900 | 180 |

A composition was prepared by blending the above ingredients. The zinc phosphate cold-rolled steel panels were cathodically electrocoated in the electrodeposition bath at 250 volts for 2 minutes at a bath temperature of 83° F. The wet films were cured at 360° F. for 17 minutes. The film builds for III-A and III-B are 1.2 mil and 0.6 mil, respectively. The film appearance for III-A is slightly rough, and the film appearance for III-B is smooth.

We claim:

1. An improved cationic electrodeposition resin to be used in aqueous cathodic electrodeposition baths wherein the resin is made by chain extending a polyepoxide of a polyglycidyl ether of polyhydric alcohol having about two epoxy groups per molecule with an internal plasticizer wherein the improvement comprises said internal plasticizer being an amide diol which is the reaction product of a diacid and an alkanol amine which has primary alcohol and primary amine terminating groups or is the reaction product of a diprimary amine and epsilon-caprolactone.

2. The resin of claim 1 wherein the amide diol is a condensation product of a diacid and an alkanol amine which has primary alcohol and primary amine terminating groups.

3. The resin of claim 1 wherein the amide diol is a reaction product of a di-primary amine and epsilon-caprolactone.

4. A method of coating an electrically conductive article with a cationic electrodeposition resin comprising:
  (1) mixing the cationic electrodeposition resin of claim 1 with an amine to form a polyepoxy amine adduct;
  (2) blending said adduct with an acid, crosslinker, and water to form a principal emulsion;
  (3) adding more water and pigment paste to the principal emulsion thereby forming an electrocoat bath;
  (4) immersing the article in the electrocoat bath; and
  (5) passing a direct current through the article.

5. The resin of claim 2 in which the molar ratio of diacid and alkanol amine is 1.5:1 to 1:1.

6. The resin of claim 3 in which the molar ratio of epilson-caprolactone and diprimary amine is 3:1 to 2:1.

* * * * *